United States Patent
Okada et al.

(10) Patent No.: US 6,892,528 B2
(45) Date of Patent: May 17, 2005

(54) CATALYST DETERIORATION DETECTING APPARATUS

(75) Inventors: Kojiro Okada, Nagoya (JP); Yasuki Tamura, Nisshin (JP); Kinichi Iwachido, Aichi-gun (JP); Osamu Nakayama, Toyota (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 10/672,691

(22) Filed: Sep. 26, 2003

(65) Prior Publication Data

US 2004/0128983 A1 Jul. 8, 2004

(30) Foreign Application Priority Data

Oct. 4, 2002 (JP) ........................................ 2002-292261

(51) Int. Cl.[7] ................................................ F01N 3/00
(52) U.S. Cl. ............................. 60/277; 60/276; 60/285; 60/297
(58) Field of Search ......................... 60/274, 276, 277, 60/285, 286, 295, 297, 301

(56) References Cited

U.S. PATENT DOCUMENTS

| | | | | |
|---|---|---|---|---|
| 5,661,972 A | * | 9/1997 | Katoh et al. ................... | 60/276 |
| 6,374,596 B2 | * | 4/2002 | Taga et al. ..................... | 60/277 |
| 6,477,833 B2 | * | 11/2002 | Tayama et al. ............... | 60/285 |
| 6,502,389 B2 | * | 1/2003 | Katayama et al. ............ | 60/285 |
| 6,622,479 B2 | * | 9/2003 | Kakuyama et al. ........... | 60/285 |

FOREIGN PATENT DOCUMENTS

| | | |
|---|---|---|
| JP | 5-248227 | 9/1993 |
| JP | 5-312074 | 11/1993 |

* cited by examiner

Primary Examiner—Binh Q. Tran
(74) Attorney, Agent, or Firm—Rossi, Kimms & McDowell

(57) ABSTRACT

A catalyst deterioration detecting apparatus aims at accurately determining whether or not a catalyst deteriorates even if a strict standard for catalyst deterioration is established. The catalyst deterioration detecting apparatus includes catalyst temperature sensing means for obtaining temperature of a catalyst, including ceria ($CeO_2$) serving as an oxygen storage agent, and deterioration detecting means for detecting a degree of deterioration of the catalyst if the temperature is obtained by the catalyst temperature sensing means is equal to or higher than an activation temperature at which the catalyst is activated and is in a particular temperature range causing $NO_X$ conversion efficiency of the catalyst to decrease.

18 Claims, 3 Drawing Sheets

CATALYST DETERIORATION DETECTING APPARATUS

BACKGROUND OF THE INVENTION

1. Field of the Invention

The present invention relates to a technique of detecting deterioration of a catalyst, disposed in a path of exhaust gas emitted from an engine used in a vehicle or the like, which catalyst particularly includes ceria serving as an oxygen storage agent and has NOx conversion capacity.

2. Description of the Related Art

In today's vehicle, a catalyst is disposed in a path of exhaust gas emitted from an engine so that exhaust gas is converted into a harmless form. In accordance with present progress in study on catalyst, various catalysts with a property of higher conversion capacity have been developed. However, conversion capacity of a catalyst is not permanently maintained, but is gradually reduced according to deterioration of the catalyst caused by usage of the catalyst. For this reason, considering from a viewpoint on prevention of environmental pollution, it is important to develop a technique for accuracy detection of a degree of catalyst deterioration as well as study on catalysts having high conversion capacity.

A Japanese patent Laid-open publication HEI 5-248227 (especially in FIG. 10), which is hereinafter called a reference 1, discloses one of conventional methods for deterioration detection of a catalyst. The technique of the reference 1 focuses on the fact that oxygen storage capacity of the catalyst. The oxygen capacity is associated with a degree of catalyst deterioration varies depending on the catalyst temperature. Further, the reference 1 focuses on the point that "new", "not-new but good" and "deteriorated" catalysts possess respective different properties of variation in oxygen storage capacity especially in a temperature range of 300–550° C. Considering the above points, the reference 1 proposes that a value used for determination of catalyst deterioration is not fixed but is flexibly set in accordance with catalyst temperature.

However, the temperature range of 300–550° C., on which the reference 1 focuses, is lower than a temperature range at which a catalyst is adequately activated. In other words, the catalyst at the above temperature range is still partially activated and has hitherto low conversion efficiency.

In the meanwhile, the recent technology can heat a catalyst at an early stage, especially an adjacent catalyst disposed adjacent to an engine, to an activation temperature at which the catalyst is activated. Additionally, such an adjacent catalyst can continuously maintain high temperature because of closeness to the engine.

A catalyst is therefore in the above low temperature range in an extremely short period under a normal running state. Practically, determination of deterioration should be performed in a high temperature range in which the catalyst is adequately activated.

As shown in FIG. 10 of the reference 1, there is a small difference in oxygen storage capacities of "new" and "not-new but good" catalysts at a temperature of 550° C. or higher. Such a small difference makes the method in the reference 1 to accurately detect a degree of catalyst deterioration.

The above conventional detection method cannot be applied to a strict anti-deterioration standard which does not permit even a minor deterioration is made in order to realize high capability of exhaust-gas conversion.

SUMMARY OF THE INVENTION

With the foregoing problems in view, it is an object of the present invention to provide a catalyst deterioration detecting apparatus can accurately detect a degree of deterioration of a catalyst even when a strict deterioration standard is established.

As a first generic feature, there is provided a catalyst deterioration detecting apparatus, comprising: a catalyst, disposed in a path of exhaust gas emitted from the engine, including ceria ($CeO_2$) serving as an oxygen storage agent; catalyst temperature sensing means for obtaining temperature of the catalyst; and deterioration detecting means for detecting a degree of deterioration of the catalyst if the temperature is obtained by the catalyst temperature sensing means is equal to or higher than an activation temperature at which the catalyst is activated and is in a particular temperature range causing $NO_X$ conversion efficiency of the catalyst to decrease.

As a preferable feature, the particular temperature range may cause the ceria to transform or may be not lower than 600° C. nor higher than 800° C., more preferably around 700° C.

Alternatively to directly obtaining temperature of the catalyst interior, the catalyst temperature sensing means may estimate the temperature of the catalyst on the basis of a running state of the engine or may estimate the temperature of the catalyst on the basis of temperature of the exhaust gas that is to be supplied to the catalyst.

As another preferable feature, the deterioration detecting means may function as follows.

In a preferable form, the deterioration detecting means may include a NOx sensor, disposed downstream of the catalyst, for sensing concentration of NOx included in the exhaust gas as a NOx signal; and the deterioration detecting means may detect the degree of deterioration based on the NOx signal, which is received from the NOx sensor when the temperature sensed by the catalyst temperature sensing means is in the particular temperature range.

In another referable form, the deterioration detecting means may include an upstream oxygen sensor and a downstream oxygen sensor, respectively disposed upstream and downstream of the catalyst, each of which is for sensing concentration of oxygen included in the exhaust gas as an oxygen signal; and the deterioration detecting means may detect the degree of deterioration by comparing the oxygen signals, respectively received from the upstream and the downstream oxygen sensors when the temperature sensed by the catalyst temperature sensing means is in the particular temperature range. As an additional preferable feature, the deterioration detecting means may detect the degree of deterioration by comparing the oxygen signals in terms of one of frequency, inversion cycle and amplitude.

In an additional preferable form, the deterioration detecting means may include an oxygen sensor, disposed downstream of the catalyst, for sensing concentration of oxygen included in the exhaust gas as an oxygen signal; and the deterioration detecting means may detect the degree of deterioration by comparing an air/fuel-ratio variation signal, which concerns an air-fuel ratio forcefully varied when the obtained temperature is in the particular temperature range, and the oxygen signal.

In a further preferable form, the deterioration detecting means may include an upstream linear A/F sensor and a downstream linear A/F sensor, respectively disposed upstream and downstream of the catalyst, each of which is for sensing an air-fuel ratio of the exhaust gas as an A/F signal; and the deterioration detecting means may detect the degree of deterioration by comparing the A/F signals, respectively received from the upstream and the downstream linear A/F sensors when the obtained temperature is in the particular temperature range. At that time, the deterioration detecting means may detect the degree of deterioration by comparing the A/F signals in terms of one of frequency, inversion cycle, and amplitude.

In a still further preferable form, the deterioration detecting means may include a linear A/F sensor, disposed downstream of the catalyst, for sensing an air-fuel ratio of the exhaust gas as A/F signal; and the deterioration detecting means may detect the degree of deterioration by comparing an air/fuel-ratio variation signal, which concerns an air-fuel ratio forcefully varied when the obtained temperature is in the particular temperature range, and the A/F signal. At that time, the deterioration detecting means may detect the degree of deterioration by comparing the air/fuel-ratio variation signal and the A/F signal in terms of one of frequency, inversion cycle, and amplitude.

As a further preferable feature, the particular temperature may cause an oxygen storage capacity of the catalyst to reduce.

In order to attain the object of the present invention, as a second generic feature, there is provided a catalyst deterioration detecting apparatus, comprising: a catalyst, disposed in a path of exhaust gas emitted from the engine, including ceria serving as an oxygen storage agent; catalyst temperature sensing means for sensing temperature of the catalyst; and deterioration detecting means for detecting a degree of deterioration of the catalyst if the temperature obtained by the catalyst temperature sensing means is equal to or higher than an activation temperature at which the catalyst is activated and is in a particular temperature range causing the ceria to transform.

As a third generic feature to accomplish the object, there is provided a catalyst deterioration detecting apparatus, comprising: a catalyst, disposed in a path of exhaust gas emitted from the engine, including ceria serving as an oxygen storage agent; catalyst temperature sensing means for obtaining temperature of the catalyst; and deterioration detecting means for detecting a degree of deterioration of the catalyst if the temperature obtained by the catalyst temperature sensing means is equal to or higher than an activation temperature at which the catalyst is activated and is in a particular temperature range causing an oxygen storage capacity of the catalyst to reduce.

As a fourth generic feature, there is provided a catalyst deterioration detecting apparatus, comprising: a catalyst, disposed in a path of exhaust gas emitted from the engine, including ceria serving as an oxygen storage agent; catalyst temperature sensing means for sensing temperature of the catalyst; and deterioration detecting means for detecting a degree of deterioration of the catalyst if the temperature obtained by the catalyst temperature sensing means is equal to or higher than an activation temperature at which the catalyst is activated and is in a temperature range around 700° C.

Other objects and further features of the present invention will be apparent from the following detailed description when read in conjunction with the accompanying drawings.

DESCRIPTION OF THE PREFERRED EMBODIMENTS

Various preferred embodiments of the present invention will now be described with reference to the accompanying drawings.

Figure 1:
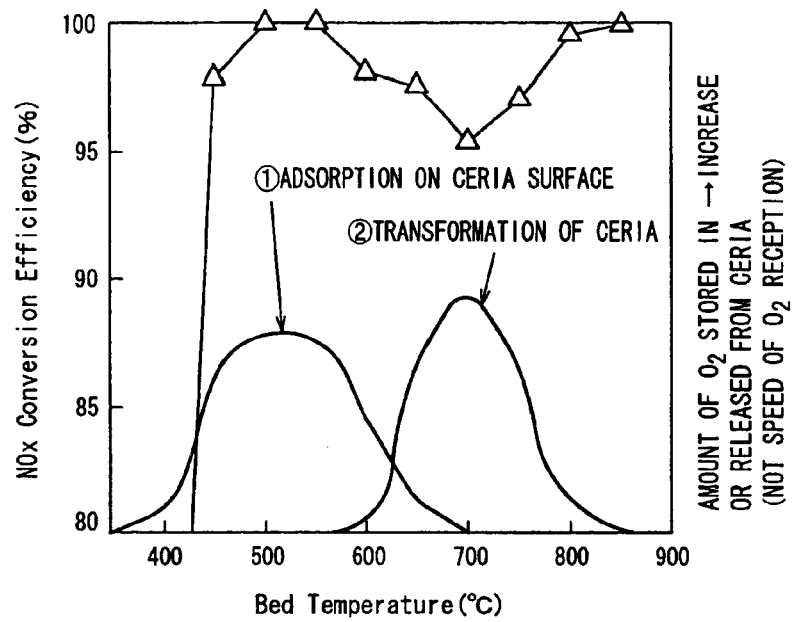
FIG. 1 is a graph showing temperature characteristics of NOx conversion efficiency of a catalyst including ceria serving as an oxygen storage agent and concurrently showing temperature characteristics of an oxygen stored/released amount of ceria.

(A) Temperature Characteristics of NOx Conversion Efficiency of a Catalyst Including Ceria:

The graph FIG. 1 shows a characteristic between NOx conversion efficiency and a catalyst temperature which catalyst including ceria ($CeO_2$) serves as an oxygen storage agent. FIG. 1 also shows characteristics between an amount of oxygen of ceria and the catalyst temperature. The characteristics are found by the Inventors during experiments regarding the present invention. Plots on the abscissa in FIG. 1 represent temperature of a catalyst bed (temperature of catalyst center); plots on the left ordinate represent NOx conversion efficiency (average conversion efficiency in a predetermined time period). The temperature of a catalyst bed can be regarded as temperature substantially identical to temperature of a catalyst in question.

As shown in FIG. 1, NOx conversion efficiency of a catalyst increases following the activation of the catalyst caused by the temperature rise and reaches approximately 100% when the temperature of the catalyst bed rises to approximate 500° C. However, the Inventors have found temperature characteristics that a further rise in temperature of the catalyst bed gradually decreases NOx conversion efficiency of the catalyst, which takes a local minimum value at around 700° C. and then NOx conversion efficiency turns to increase again. The reason for decrease in NOx conversion efficiency at around 700° C. has not been revealed yet, but is roughly presumed as follows.

A catalyst used in the experiments includes ceria, serving as an oxygen storage agent, in addition to one or more noble metals having a catalytic action. It is therefore presumed that the oxidative action of $O_2$ that is to be supplied to the noble metals from ceria oxidizes CO so as to form $CO_2$ and CO poisoning on the noble metals is inhibited so that conversion capability of the catalyst is maintained. It is presumed that ceria provides noble metals with $O_2$ in either of below manners (mechanisms).

One manner (mechanism) is associated with storage/release of $O_2$ attached on/detached from a surface of the ceria. As shown plots with respect to the right ordinate in FIG. 1, an amount of stored/released $O_2$, by the ceria surface attaching/detaching increases in accordance with the rise in the catalyst bed temperature (catalyst temperature) and peaks at around 500–550° C., at which NOx conversion efficiency reaches approximately 100%. When the catalyst temperature further rises, an amount of stored/released $O_2$ by the ceria surface gradually decreases.

The other manner (mechanism) is associated with transformation of ceria. The ceria transformation is caused by a chemical reaction represented by the following chemical reaction formula (1) in which $O_2$ retained in the structure of ceria is released.

  (1)

It is known that this transformation of ceria occurs in the temperature range around 700° C. As shown in graph FIG. 1, an amount of $O_2$ released by transformation of ceria starts to increase at a temperature lower than 600° C. and the release amount peaks at around 700° C. When the catalyst bed temperature further rises, the amount of released $O_2$ caused by ceria transformation gradually reduces.

Manners that ceria provides noble metals with $O_2$ alters depending on catalyst temperature; the mechanism alters from storage/release of $O_2$ caused by the ceria surface to caused by ceria formation in accordance with a rise in catalyst temperature. The first mechanism can store and release $O_2$ rapidly because $O_2$ is attached on the surface of ceria by a weak force. Conversely, the second mechanism takes a longer time to release $O_2$ as compared to the first mechanism since $O_2$ release is caused by ceria transformation that is a result of a reaction involving the whole part of ceria.

In a temperature range of 600–800° C. in which $O_2$ is provided predominately by the second mechanism, decreasing speed to provide noble metals with $O_2$ from ceria causes the noble metals to be deficient in $O_2$. Since $O_2$ deficiency decreases capability to oxidize CO included in exhaust gas, remaining CO, which has not been oxidized, poisons the noble metals. CO poisoning over noble metals diminishes the ability of the noble metal to function as a catalyst so that NOx conversion efficiency of the catalyst is reduced.

As described above, it is presumed that the main reason of reducing NOx conversion efficiency of the catalyst when the catalyst bed temperature is around 700° C.; a decline of the capacity of ceria to provide $O_2$ (hereinafter, also called $O_2$ storage capacity) is declined. And the decline is made caused by altering of the manner of providing noble metals with $O_2$ from the ceria surface to by the transformation of ceria.

The Inventors have invented the following two methods to detect a degree of deterioration of the catalyst having the above-mentioned temperature characteristics of NOx conversion efficiency.

The first detecting method focuses on a decline of $O_2$ storage capacity caused by the ceria transformation. The deterioration of catalyst can be regarded as deterioration of ceria, and the ceria deterioration ceases the transformation represented by the chemical formula (1). For this reason, in a temperature range of 600–800° C., in which ceria transformation predominately provides $O_2$, the more a catalyst deteriorates, the more the $O_2$ storage capacity declines. Especially, the difference between $O_2$ storage capacities of a catalyst, before and after undergoing deterioration, becomes the maximum at around 700° C. at which ceria transformation proceeds most.

A degree of decline of $O_2$ storage capacity is detected by an oxygen sensor, such as an $O_2$ sensor or a linear A/F sensor for sensing concentration of oxygen as an oxygen signal. For example, if a pair of upstream and downstream oxygen sensors are disposed upstream and downstream of the catalyst, the difference between oxygen signals obtained by the oxygen sensors varies before and after deterioration of a catalyst because of $O_2$ storage capacity of the catalyst. Specifically, when variation in air-fuel ratio under feedback control over fuel-injection amount makes a perturbation on a variation of oxygen concentration in exhaust gas, an catalyst having adequate $O_2$ storage capacity results in an oxygen signal, which is obtained in the downstream $O_2$ sensor, smaller in frequency, inversion period and amplitude than an oxygen signal obtained in the upstream $O_2$ sensor. But these factors of the oxygen signal of the downstream $O_2$ sensor approaches those of the oxygen signal of the upstream $O_2$ sensor as the catalyst gets deteriorated and $O_2$ storage capacity declines accordingly. A degree of the approach increases as $O_2$ storage capacity gets increased in accordance with deterioration of the catalyst.

Further, when an oxygen sensor is disposed downstream of the catalyst and an air-fuel ratio is forcefully varied, the difference of an air/fuel-ratio variation signal and an oxygen signal from an oxygen sensor varies before and after deterioration of the catalyst and the degree of variation of the difference increases as $O_2$ storage capacity declines in accordance with catalyst deterioration.

Each of the above degrees of variation becomes the maximum at catalyst temperature around 700° C., at which the difference in $O_2$ storage capacities, before and after catalyst deterioration, also becomes the maximum. It is therefore possible to detect a degree of deterioration of the catalyst with ease by detecting any one of the above degrees of variation when the catalyst bed is around 700° C. and comparing the detected degree with a corresponding predetermined standard value.

The second detecting method focuses on a decline of NOx conversion efficiency as a consequence of reduction of $O_2$ storage capacity. As described above, reduction of $O_2$ storage capacity causes deficiency in $O_2$ that is to be provided to the noble metals in a temperature range of 600–800° C. in which $O_2$ is provided predominately by transformation of ceria whereupon capability to oxidize CO included in exhaust gas reduced and the remaining CO poisons the noble metals. The CO poisoning over the noble metals reduces NOx conversion efficiency of the catalyst and CO poisoning is presumed to be chiefly caused by ceria transformation due to deterioration of ceria. For this reason, the CO poisoning proceeds as the $O_2$ storage capacity getting lowered and NOx conversion efficiency is reduced accordingly.

Figure 2:
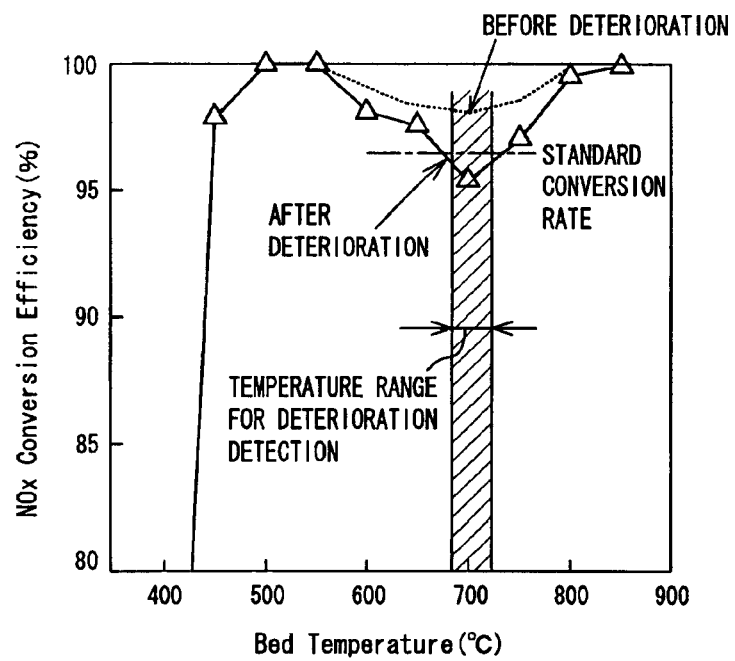
FIG. 2 is a graph showing, for comparison, temperature characteristics of NOx conversion efficiency of a catalyst including ceria, serving as an oxygen storage agent, before and after the catalyst deteriorates.

The graph of FIG. 2 shows temperature characteristics of NOx conversion efficiency of a catalyst before (the dotted line) and after (the solid line) the catalyst deteriorates for a comparison. As shown in FIG. 2, NOx conversion efficiencies of catalyst, before and after deterioration, are substantially same at a temperature up to around 550° C. However, the NOx conversion efficiencies differs at a temperature range not lower than 600° C. nor higher than 800° C. Above all, the difference in the NOx conversion efficiency between a point before and a point after catalyst deterioration becomes the maximum at around 700° C., at which ceria transforms most.

A temperature range of 600–800° C., preferably a range around 700° C. as shown in FIG. 2, is defined as a particular temperature range for detecting a degree of deterioration of the catalyst. Comparison between NOx conversion efficiency of a catalyst in the particular temperature range and a standard conversion efficiency(the one-dotted line in the drawing) defined as the determination standard can make it possible to definitely discriminate whether or not the catalyst deteriorates. This can precisely detect a degree of deterioration of acatalyst with ease. Since NOx conversion efficiency corresponds to a NOx signal, i.e., concentration of NOx sensed by a NOx sensor, the detection of a degree of deterioration can be carried out by obtaining a NOx signal when catalyst bed temperature is in the particular temperature range and comparing the obtained NOx signal with a predetermined standard value (corresponding to the above standard conversion efficiency).

Hereinafter is description of catalyst deterioration detecting apparatuses according to first and second embodiments respectively to carry out the first and the second deterioration detecting methods.

(B) First Embodiment

Figure 3:
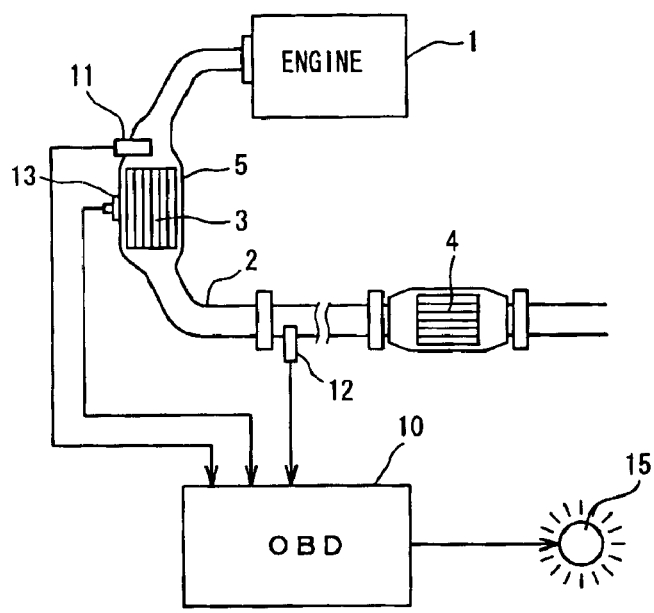
FIG. 3 is a schematic diagram illustrating the system configuration of a catalyst deterioration detecting apparatus according to a first embodiment of the present invention.

FIG. 3 schematically illustrates the system configuration of acatalyst deterioration detecting apparatus according to a first embodiment of the present invention. As shown in FIG. 3, an underfloor catalyst 4 and an adjacent catalyst 3 are disposed in a path 2 and respectively at the underfloor of a vehicle and at an adjacent portion to an engine 1. The adjacent catalyst 3 tends to reache to a high temperature (700–900° C.) earlier than the underfloor catalyst 4 because the adjacent catalyst 3 is closer to the engine 1. The adjacent catalyst 3 is a three-way catalyst including ceria, serving as an oxygen storage agent, and exhibits the temperature characteristics of NOx conversion efficiency shown in graph FIG. 1. The catalyst deterioration detecting apparatus of the first embodiment takes the form of an on-board diagnostic (OBD) 10 for detecting a degree of deterioration of the adjacent catalyst 3.

$O_2$ sensors 11 and 12 are respectively disposed upstream and downstream of the adjacent catalyst 3 and disposed in the path 2. The $O_2$ sensors 11 and 12 measures $O_2$ concentration and create $O_2$ signals that largely varies at the air-fuel ration, the boundary. A temperature sensor 13 for obtaining temperature (precisely bed temperature) of the adjacent catalyst 3 is disposed on a casing 5 supporting the adjacent catalyst 3. The $O_2$ sensors 11 and 12 and the temperature sensor 13 are connected to the input side of the OBD 10 so that OBD 10 receives various signals from the individual sensors 11, 12 and 13. An OBD monitor 15 which is arranged in the operator cab is connected to the output side of the OBD 10.

Figure 4:
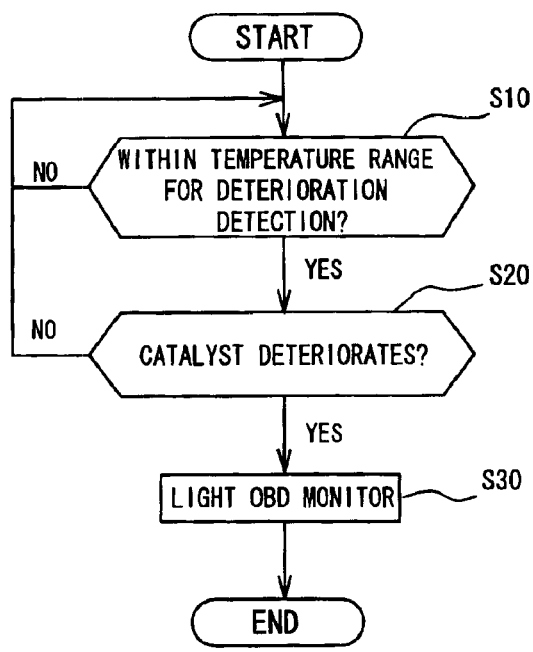
FIG. 4 is a flow diagram illustrating a succession of procedural steps for determining whether or not a catalyst deteriorates according to the first embodiment.

The OBD 10 has functions as deterioration detecting means of the present invention and carries out a succession of procedural steps of flow diagram FIG. 4 in order to determine whether or not the adjacent catalyst 3 deteriorates using $O_2$ signals received from the $O_2$ sensors 11 and 12 and the obtained temperature received from the temperature sensor 13. Next, a process for deterioration determination carried out by the OBD 10 will now be described with reference to flow diagram FIG. 4.

First of all, the OBD 10 determines whether or not the catalyst temperature obtained by the temperature sensor 13 is within the particular temperature range for deterioration detection in step S10. Here, the particular temperature range is set in temperature range around 700° C. (700° C.±α).

If the catalyst temperature is determined to be in the particular temperature range for deterioration detection, the OBD 10 compares $O_2$ signals respectively received from the upstream (front) $O_2$ sensor 11 and the downstream (rear) $O_2$ sensor 12 in the ensuing step S20. Specifically, when the fuel-injection amount is feed-back controlled such that an $O_2$ signal received from the upstream $O_2$ sensor 11 varies at a predetermined frequency, adequate $O_2$ storage capacity due to the adjacent catalyst 3 in an intact state causes the adjacent catalyst 3 to temporarily store $O_2$ so that variation of $O_2$ concentration is smoothed downstream of the adjacent catalyst 3. The $O_2$ signal received from the downstream $O_2$ sensor 12 hardly therefore varies and frequency thereof becomes lower that that of the $O_2$ signal received from the upstream $O_2$ sensor 11. On the other hand, when $O_2$ storage capacity declines in accordance with deterioration of the adjacent catalyst 3, since the above action also declines and the downstream $O_2$ signal received from the downstream $O_2$ sensor 12 comes to have a higher frequency, which varies at a frequency substantially same as that of the upstream $O_2$signal received from the upstream $O_2$ sensor 11. $O_2$ storage capacity decline of the adjacent catalyst 3 varies the difference of frequencies of the $O_2$ signals respectively from the $O_2$ sensors 11 and 12. If the difference of frequencies of the $O_2$ signals respectively from the $O_2$ sensors 11 and 12 becomes equal to or lower than a predetermined standard value, i.e., when the frequency of the upstream $O_2$ signal of the downstream $O_2$ sensor 12 approaches that of the downstream $O_2$ signal received from the upstream $O_2$ sensor 11, the OBD 10 determines that the adjacent catalyst 3 deteriorates.

The steps S10 and S20 are repeated until both of them obtain positive results. If the adjacent catalyst 3 is determined to deteriorate so that step S20 is satisfied when step S10 is satisfied, i.e., the catalyst temperature is around 700° C., the OBD 10 outputs a signal to the OBD monitor 15. By this way, the OBD 10 warns the driver of deterioration of the adjacent catalyst 3.

The difference in frequency between $O_2$ signals from the downstream $O_2$ sensor 12 and the upstream $O_2$ sensor 11 varies before and after the adjacent catalyst 3 deteriorates. The degree of difference variation increases in accordance of an increased degree of decline of $O_2$ storage capacity caused by deterioration of the adjacent catalyst 3 and becomes the maximum when the catalyst temperature is around 700° C. In other words, as the adjacent catalyst 3 gets deteriorated to reduce $O_2$ storage capacity, the frequency of the $O_2$ signal from the downstream $O_2$ sensor 12 approaches that from the upstream $O_2$ sensor 11. The OBD 10 of the first embodiment can definitely discriminates an intact catalyst from a deteriorated catalyst by comparing $O_2$ signals from the upstream and the downstream $O_2$ sensors 11 and 12, which signals concern at the time when the catalyst temperature is around 700° C. As a result, it is possible to accurately detect a degree of deterioration of the adjacent catalyst 3.

The system of FIG. 3 includes two $O_2$ sensors 11 and 12, respectively arranged upstream and downstream of the adjacent catalyst 3. If the system includes only the downstream $O_2$ sensor 12, the comparison for deterioration detection may be performed on the $O_2$ signal from the upstream $O_2$ sensor 12 and an air/fuel-ratio variation signal concerning an air/fuel ratio that has been forcefully varied. Specifically, an air/fuel-ratio control function for carrying out an open-loop control over a fuel-injection amount in order to forcefully varies an air/fuel ratio is incorporated into a non-illustrated engine controller for controlling the engine 1. While the engine controller forcefully varies the air/fuel ratio, the OBD 10 obtains a variation signal concerning the varied air/fuel ratio. Even if the frequency of the variation signal is unchanged, the frequency of the $O_2$ signal from the downstream $O_2$ sensor 12 changes in accordance with a degree of decline of $O_2$ storage capacity of the adjacent catalyst 3. Therefore, the OBD 10 compares the frequency of the $O_2$ signal from the downstream $O_2$ sensor 12 with a predetermined standard value while a variation signal with a predetermined frequency is input, so that it is possible to accurately detect a degree of deterioration of the adjacent catalyst 3. As a result, the OBD 10 can definitely determine whether or not the adjacent catalyst 3 deteriorates. Such deterioration detection is performed when the catalyst temperature (the catalyst bed temperature) obtained by the temperature sensor 13 is in the above particular temperature range for deterioration detection.

In the illustrated example, $O_2$ signals from the upstream $O_2$ sensor 11 and the downstream $O_2$ sensor 12 are compared in terms of frequency. Alternatively, the comparison may be made in terms of inversion period or amplitude.

Further, the illustrated example utilizes one or two $O_2$ sensors to obtain $O_2$ concentration. Alternatively, linear A/F sensors 16 and 17 each of which is for linearly obtaining an air/fuel ratio may be used as substitutions for the $O_2$ sensors 11 and 12 shown in FIG. 1.

(C) Second Embodiment

Figure 5:
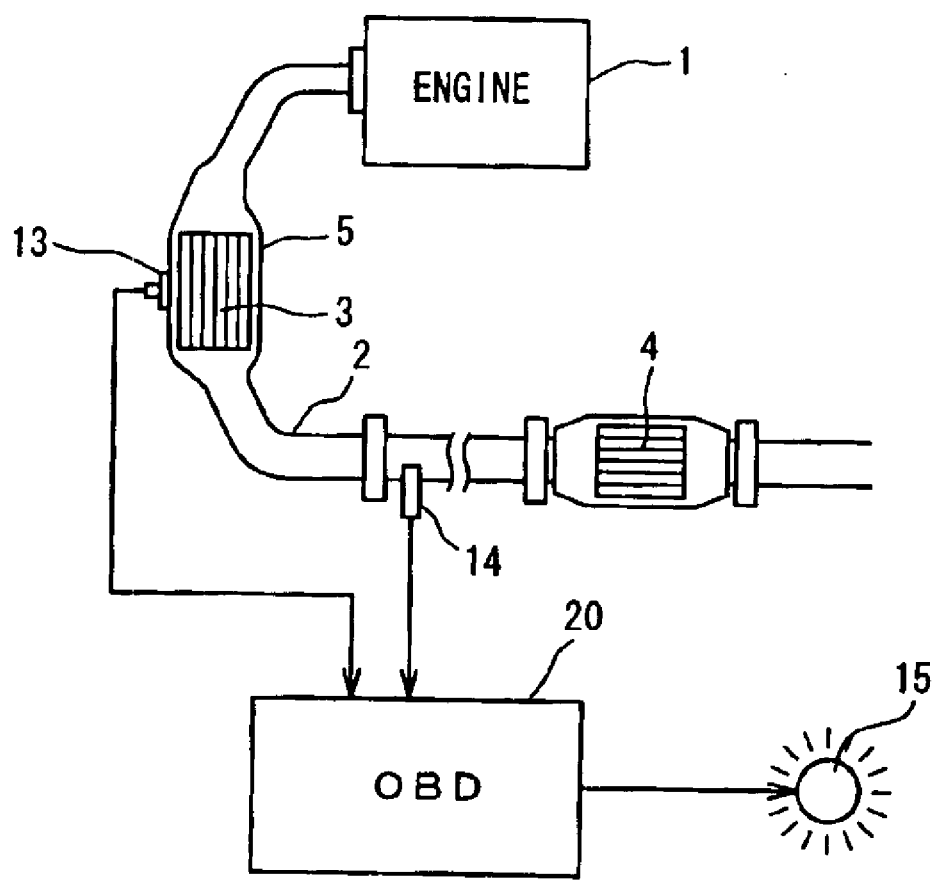
FIG. 5 is a schematic diagram illustrating the system configuration of a catalyst deterioration detecting apparatus according to a second embodiment of the present invention.

FIG. 5 schematically illustrates the system configuration of a catalyst deterioration detecting apparatus according to a second embodiment of the present invention. In FIG. 5, elements and parts which are identical those in FIG. 1 of the first embodiment, and are designated by the same number as those in FIG. 1.

Similar to the first embodiment, the catalyst deterioration detecting apparatus of this second embodiment takes the form of an on-board diagnostic (OBD) 20 for detecting a degree of deterioration of an adjacent catalyst 3. A NOx sensor 14 is disposed in path 2 and downstream of the adjacent catalyst 3 in the second embodiment. The NOx sensor 14 has a function for detecting concentration of NOx included in exhaust gas as a NOx signal. The NOx sensor 14 and a temperature sensor 13 are connected to the input side of the OBD 20 so that the OBD 20 receives various signals from each of sensors 13 and 14. An OBD monitor 15 is connected to the output side of the OBD 20.

The OBD 20 has functions as deterioration detecting means of the present invention and determines, using signals from the NOx sensor 14 and the temperature sensor 13, whether or not the adjacent catalyst 3 deteriorates. The deterioration detection carried out by the OBD 20 is illustrated by a succession of procedural steps of flow diagram FIG. 4 similarly to the first embodiment. First of all, the OBD 20 determines whether or not the catalyst temperature obtained by the temperature sensor 13 is within the particular temperature range for deterioration detection.

If the OBD 20 determines that the obtained temperature is in the particular temperature range, the OBD 20 compares a NOx signal with a predetermined standard value (a standard signal value) for deterioration detection. A NOx signal from the NOx sensor 14 is associated with NOx conversion efficiency. The more NOx conversion efficiency declines, the larger the NOx signal becomes. The above standard value is identical to a NOx signal from the NOx sensor 14 which signal corresponds to the NOx conversion efficiency serving as a boundary to discriminate an intact catalyst from a deteriorated catalyst. The OBD 20 determines that the adjacent catalyst 3 deteriorates when a NOx signal from the NOx sensor 14 exceeds the standard value and warns the driver of deterioration of the adjacent catalyst 3 by lighting the OBD monitor 15.

The NOx signal from the NOx sensor 14 varies before and after deterioration of the adjacent catalyst 3. The NOx signal becomes larger, as compared to a NOx signal obtained after passing a new catalyst, as the adjacent catalyst 3 gets deteriorated causing further decline in $O_2$ storage capacity and becomes the maximum when the catalyst temperature is at around 700° C. The OBD 20 of the second embodiment can definitely discriminate an intact catalyst from a deteriorated catalyst by comparing a NOx signal obtained by the NOx sensor 14 when the catalyst temperature is in a range lines around 700° C. with the standard value. As a result, it is possible to accurately detect a degree of deterioration of the adjacent catalyst 3.

In the illustrated example, a NOx signal from the NOx sensor 14 is directly compared with the standard value. Alternatively, the OBD 20 may obtain an amount in variation of the NOx signal from before until after catalyst deterioration and compare the obtained amount with a standard value (a standard variation value). The variation of a NOx signal from the NOx sensor 14 with respect to a new catalyst becomes larger as a catalyst gets deteriorated whereupon the comparison between an amount of variation and the standard value can accurately detect a degree of deterioration of the adjacent catalyst 3.

(D) Others:

Further, the present invention should by no means be limited to these foregoing embodiments, and various changes or modifications may be suggested without departing from the gist of the invention. For example, the OBD 10 detects a degree of deterioration of the adjacent catalyst 3. Alternatively, if the underfloor catalyst 4 includes ceria serving as a oxygen storage agent, a degree of deterioration of the underfloor catalyst 4 may be detected using sensors 11, 12, 13 and 14 each of which is disposed upstream or downstream of the underfloor catalyst 4.

In the foregoing embodiments, a temperature range for deterioration detection is set to a temperature range around 700° C. (700° C.±α). As an alternative, the temperature range may be not lower than 600° C. nor higher than 800° C. at which ceria included in a catalyst transforms. The alternative temperature range causes a difference in $O_2$ storage capacity from before until after catalyst deterioration as compared with another temperature range. However, when deterioration detection is performed on a temperature range except that around 700° C., a standard value for deterioration detection should be changed in accordance with a method for deterioration detection. In order to obtain the most preferable result of the present invention, the temperature range should be set around 700° C., at which the difference in $O_2$ storage capacity, before and after catalyst deterioration, becomes the maximum.

In order to obtain temperature of a catalyst in the above embodiments, a temperature sensor obtains temperature of a bed portion supporting the catalyst. Alternatively, a temperature sensor may be disposed in path of exhaust gas so that catalyst temperature is estimated based on temperature of exhaust gas flowing through the path. Further alternatively, the catalyst temperature may be estimated based on a running state of engine, such as change of torque and/or rotation speed of the engine since the engine has started.

As described above, the catalyst deterioration detecting apparatus of the present invention detects a degree of deterioration of a catalyst when the catalyst is in a temperature range presumed to make the difference in NOx conversion efficiency, before and after catalyst deterioration, i.e., a particular temperature range is equal to or higher than an activation temperature at which the catalyst is activated and is in a particular temperature range causing NOx conversion efficiency of the catalyst to decrease. It is therefore possible to accurately determine whether or not a catalyst deteriorate, eliminating possibility of mistakenly discrimination between an intact catalyst and a deteriorated catalyst.

What is claimed is:

1. A catalyst deterioration detecting apparatus, comprising:
   a catalyst, disposed in a path of exhaust gas emitted from the engine, including ceria serving as an oxygen storage agent;

catalyst temperature sensing means for obtaining temperature of said catalyst;

judgment means for judging whether the temperature obtained by said catalyst temperature sensing means is equal to or higher than an activation temperature at which said catalyst is activated and is in a particular temperature range that causes $NO_x$ conversion efficiency of said catalyst to decrease; and deterioration detecting means for detecting a degree of deterioration of said catalyst when said judgment means determines that the temperature obtained by said catalyst temperature sensing means is equal to or higher than said activation temperature and is in said particular temperature range.

2. A catalyst deterioration detecting apparatus according to claim 1, wherein the particular temperature range causes the ceria to transform.

3. A catalyst deterioration detecting apparatus according to claim 1, wherein the particular temperature range is not lower than 600° C. or higher than 800° C.

4. A catalyst deterioration detecting apparatus according to claim 3, wherein the particular temperature range lies around 700° C.

5. A catalyst deterioration detecting apparatus according to claim 1, wherein said catalyst temperature sensing means estimates the temperature of said catalyst on the basis of a running state of the engine.

6. A catalyst deterioration detecting apparatus according to claim 1, wherein said catalyst temperature sensing means estimates the temperature of said catalyst on the basis of temperature of the exhaust gas that is to be supplied to said catalyst.

7. A catalyst deterioration detecting apparatus comprising:

a catalyst disposed in a path of exhaust gas emitted from the engine and including ceria serving as an oxygen storage agent;

catalyst temperature sensing means for obtaining temperature of said catalyst; and deterioration detecting means for detecting degree of deterioration of said catalyst if the temperature is obtained by said catalyst temperature sensing means is equal to or higher than an activation temperature at which said catalyst is activated and is in a particular temperature range causing $NO_x$ conversion efficiency of said catalyst to decrease, wherein said deterioration detecting means includes a $NO_x$ sensor, disposed downstream of said catalyst, for sensing concentration of $NO_x$ included in the exhaust gas as a $NO_x$ signal, and wherein said deterioration detecting means detects the degree of deterioration based on the $NO_x$ signal, which is received from said $NO_x$ sensor when the temperature sensed by said catalyst temperature sensing means is in the particular temperature range.

8. A catalyst deterioration detecting apparatus according to claim 7, wherein said deterioration detecting means detects the degree of deterioration on the basis of a variation of the $NO_x$ signal.

9. A catalyst deterioration detecting apparatus according to claim 1, wherein:

said deterioration detecting means includes an upstream oxygen sensor and a downstream oxygen sensor, respectively disposed upstream and downstream of said catalyst, for sensing concentration of oxygen included in the exhaust gas as an oxygen signal; and said deterioration detecting means detects the degree of deterioration by comparing the oxygen signals, respectively received from said upstream and said downstream oxygen sensors when the temperature sensed by said catalyst temperature sensing means is in the particular temperature range.

10. A catalyst deterioration detecting apparatus comprising:

a catalyst disposed in a path of exhaust gas emitted from the engine and including ceria serving as an oxygen storage agent;

catalyst temperature sensing means for obtaining temperature of said catalyst; and deterioration detecting means for detecting a degree of deterioration of said catalyst if the temperature obtained by said catalyst temperature sensing means is equal to or higher than an activation temperatures at which said catalyst is activated and is in a particular temperature range causing $NO_x$ conversion efficiency of said catalyst to decrease, wherein said deterioration detecting means includes an upstream oxygen sensor and a downstream oxygen sensor, respectively disposed upstream and downstream of said catalyst, for sensing concentration of oxygen included in the exhaust gas as an oxygen signal wherein said deterioration detecting means detects the degree of deterioration by comparing the oxygen signals, respectively received from said upstream and said downstream oxygen sensors when the temperature sensed by said catalyst temperature sensing means is in the particular temperature range, wherein said deterioration detecting means detects the degree of deterioration by comparing the oxygen signals in terms of one of frequency, inversion cycle and amplitude.

11. A catalyst deterioration detecting apparatus according to claim 1, wherein:

said deterioration detecting means includes an oxygen sensor, disposed downstream of said catalyst, for sensing concentration of oxygen included in the exhaust gas as an oxygen signal; and said deterioration detecting means detects the degree of deterioration by comparing an air/fuel-ratio variation signal, which concerns an air-fuel ratio forcefully varied when the obtained temperature is in the particular temperature range, and the oxygen signal.

12. A catalyst deterioration detecting apparatus comprising:

a catalyst disposed in a path of exhaust gas emitted from the engine and including ceria serving as an oxygen storage agent;

catalyst temperature sensing means for obtaining temperature of said catalyst; and deterioration detecting means for detecting a degree of deterioration of said catalyst if the temperature obtained by said catalyst temperature sensing means is equal to or higher than an activation temperature at which said catalyst is activated and is in a particular temperature range causing $NO_x$ conversion efficiency of said catalyst to decrease, wherein said deterioration detecting means includes an oxygen sensor, disposed downstream of said catalyst, for sensing concentration of oxygen included in the exhaust gas as an oxygen signal, wherein said deterioration detecting means detects the degree of deterioration by comparing an air/fuel-ratio variation signal, which concerns an air-fuel ratio forcefully varied when the obtained temperature is in the particular temperature range, and the oxygen signal, and wherein said deterioration detecting means detects the degree of deterioration by comparing the air/fuel-ratio variation signal and the oxygen signal in terms of one of frequency, inversion cycle, and amplitude.

13. A catalyst deterioration detecting apparatus according to claim 1, wherein:

said deterioration detecting means includes an upstream linear A/F sensor and a downstream linear A/F sensor, respectively disposed upstream and downstream of said catalyst, for sensing en air-fuel ratio of the exhaust gas as an A/F signal; and said deterioration detecting means detects the degree of deterioration by comparing the A/F signals, respectively received from said upstream and said downstream linear A/F sensors when the obtained temperature is in the particular temperature range.

14. A catalyst deterioration detecting apparatus comprising:

a catalyst disposed in a path of exhaust gas emitted from the engine and including ceria serving as an oxygen storage agent;

catalyst temperature sensing means for obtaining temperature of said catalyst; and deterioration detecting means for detecting a degree of deterioration of said catalyst if the temperature obtained by said catalyst temperature sensing means is equal to or higher than an activation temperature at which said catalyst is activated and is in a particular temperature range causing $NO_x$ conversion efficiency of said catalyst to decrease, wherein said deterioration detecting means includes an upstream linear A/F sensor and a downstream linear A/F sensor, respectively disposed upstream and downstream of said catalyst, for sensing an air-fuel ratio of the exhaust gas as an A/F signal, wherein said deterioration detecting means detects the degree of deterioration by comparing the A/F signals, respectively received from said upstream and said downstream linear A/F sensors when the obtained temperature is in the particular temperature range, and wherein said deterioration detecting means detects the degree of deterioration by comparing the A/F signals in terms of one of frequency, inversion cycle, and amplitude.

15. A catalyst deterioration detecting apparatus according to claim 1, wherein:

said deterioration detecting means includes a linear A/F sensor, disposed downstream of said catalyst, for sensing an air-fuel ratio of the exhaust gas as A/F signal; and said deterioration detecting means detects the degree of deterioration by comparing an air/fuel-ratio variation signal, which concerns an air-fuel ratio forcefully varied when the obtained temperature is in the particular temperature range, and the A/P signal.

16. A catalyst deterioration detecting apparatus comprising:

a catalyst disposed in a path of exhaust gas emitted from the engine and including ceria serving as an oxygen storage agent;

catalyst temperature sensing means for obtaining temperature of said catalyst; and deterioration detecting means for detecting a degree of deterioration of said catalyst if the temperature obtained by said catalyst temperature sensing means is equal to or higher than an activation temperature at which said catalyst is activated and is in a particular temperature range causing $NO_x$ conversion efficiency of said catalyst to decrease, wherein said deterioration detecting means includes a linear A/F sensor, disposed downstream of said catalyst, for sensing an air-fuel ratio of the exhaust gas as A/F signal, wherein said deterioration detecting means detects the degree of deterioration by comparing an air/fuel-ratio variation signal, which concerns an air-fuel ratio forcefully varied when the obtained temperature is in the particular temperature range, and the A/F signal, and wherein said deterioration detecting means detects the degree of deterioration by comparing the air/fuel-ratio variation signal and the A/F signal in terms of one of frequency, inversion cycle, and amplitude.

17. A catalyst deterioration detecting apparatus, comprising:

a catalyst, disposed in a path of exhaust gas emitted from the engine, including ceria serving as an oxygen storage agent;

catalyst temperature sensing means for sensing temperature of said catalyst;

judgment means for judging whether the temperature obtained by said catalyst temperature sensing means is equal to or higher than an activation temperature at which said catalyst is activated and is in a particular temperature range that causes the ceria to transform; and deterioration detecting means for detecting a degree of deterioration of said catalyst when said judgment means determines that the temperature obtained by said catalyst temperature sensing means is equal to or higher than said activation temperature and is in said particular temperature range.

18. A catalyst deterioration detecting apparatus according to claim 1, wherein said particular temperature range causes an oxygen storage capacity of said catalyst to reduce.

* * * * *